(12) United States Patent
Marshall et al.

(10) Patent No.: US 7,183,925 B2
(45) Date of Patent: Feb. 27, 2007

(54) INTERACTIVE SYSTEM USING TAGS

(75) Inventors: Christopher Brian Marshall, Haywards Heath (GB); Paul John Rankin, Horley (GB); Alan James Davie, East Grinstead (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 121 days.

(21) Appl. No.: 10/505,497

(22) PCT Filed: Feb. 3, 2003

(86) PCT No.: PCT/IB03/00432

§ 371 (c)(1),
(2), (4) Date: Aug. 24, 2004

(87) PCT Pub. No.: WO03/073370

PCT Pub. Date: Sep. 4, 2003

(65) Prior Publication Data
US 2005/0140504 A1 Jun. 30, 2005

(30) Foreign Application Priority Data
Feb. 28, 2002 (GB) .................. 0204686.0

(51) Int. Cl.
*G08B 13/14* (2006.01)

(52) U.S. Cl. .................. 340/572.4; 340/572.1

(58) Field of Classification Search ............. 340/572.4, 340/572.1, 568.1, 522, 571, 539.1, 5.31
See application file for complete search history.

(56) References Cited

U.S. PATENT DOCUMENTS

| 5,886,634 A * | 3/1999 | Muhme .................. 340/572.1 |
| 6,232,877 B1 * | 5/2001 | Ashwin .................. 340/572.1 |
| 6,243,447 B1 * | 6/2001 | Swartz et al. ............ 379/93.12 |
| 6,942,158 B2 * | 9/2005 | Waters ...................... 235/492 |

FOREIGN PATENT DOCUMENTS

| EP | 0645728 A2 | 3/1995 |
| WO | WO9706479 A2 | 2/1997 |

* cited by examiner

Primary Examiner—John Tweel, Jr.
(74) Attorney, Agent, or Firm—Yan Glickberg

(57) ABSTRACT

An interactive system in which information read from two or more tags (10, 12 or 10, 12') jointly determines a process to be carried out. One of the tags may identify a user by for example his/her store loyalty card number or by a personal identifying tag (or card) in a cordless RF terminal and the other of the tags may be a RF-ID tag storing details of an action to be performed such as the number of credit points to be given to the loyalty card in response to a transaction or provide promotional information to the user. The process may comprise issuing a command to an action server (28, 30) to provide, or instruct the sending of, output information to a user, by for example over a radio link to a cellular telephone apparatus (18, 34, 36) or PDA, or displayed to the user on a video display unit (38).

19 Claims, 3 Drawing Sheets

INTERACTIVE SYSTEM USING TAGS

The present application claims the benefit of International Application No. PCT/IB03/00432 entitled "Interactive System Using Tags" filed Feb. 3, 2003 which claims the benefit of International Application No. PCT/IB2003/000432 entitled "Interactive System Using Tags" filed Feb. 28, 2002, the entire disclosure of which is incorporated herein by reference.

FIELD OF THE INVENTION

The present invention relates to an interactive system which makes use of tags, particularly but not exclusively tags which can be read in a non-contact manner, for example by radio.

BACKGROUND OF THE INVENTION

RF identification technology is well known as a means of identifying persons or objects carrying radio tags over a short distance of typically 1 m or so, without physical contact. Applications of this technology include the tagging of animals, such as pet dogs, cattle and sheep, identifying the location of people in potentially hazardous areas, such as offshore drilling platforms, and the tracking of goods in retail and logistic situations. They form a basic mechanism for a very convenient form of interaction between a system and people or devices.

PCT Patent Specification WO97/06479 discloses a computerised interactor system which comprises means defining a detection space, a plurality of physical interactors which can be manually placed at desired positions within the detection space or removed from the detection space to provide a plurality of selectable and changeable arrangements of the interactors at the plurality of positions of the detection space. An interface responsive to an interactor is provided in the detection space and is operative to provide an interactor signal indicative of the identity and status of the interactor. A computer system is coupled to the interface and is operative to process the interactor signal to create a control input that is indicative of the identity and status of the interactor within a predetermined semantic framework. An application system is coupled to the computer system and is responsive to the control input. The disclosed interactor system depends on the spacial positioning of the interactors in the detection space in order to generate the interactive signal.

SUMMARY OF THE INVENTION

An object of the present invention is to provide an interactive system which is flexible to operate and does not rely on the spatial positioning of interactors.

According to a first aspect of the present invention there is provided a method of operating an interactive system, comprising obtaining within a specified time period first information from a first tag and second information from a second tag, and using the first and second information to jointly determine a process to be carried out.

According to a second aspect of the present invention there is provided an interactive system in which information read within a specified time period from at least two tags jointly determine a process to be carried out.

An embodiment of the interactive system comprises tag reading means for reading at least a first and a second tag within a specified time period, the first tag containing first information and the second tag containing second information which may be less secure than the first information, the tag reading means using the first and second information jointly to determine a process to be carried out.

An action server responsive to the determined process, which may be the issuing of a command, generates an output signal containing information useful to a user. The output signal may be an SMS message or a voice mail message which is received by a cellular telephone or an e-mail message sent over a cellular telephone network to a cordless terminal such as a WAP phone or a laptop computer including a modem and radio transceiver.

The tag reading means may be able to read two or more tags presented substantially simultaneously to it. Thus a user carrying the tags does not of necessity have to present them separately to an in-range tag reading means or even remove the tags from his/her pocket or bag, subject to their being interrogatable. In some applications the tag reading means may comprise respective transponders for reading two types of tags, for example one tag may be incorporated in a Bluetooth, RTM, terminal which provides identifying information and a second tag may be a RF-ID card storing an action. Outputs from the transponders are combined in the tag reading means which determines the process to be carried out by an action server.

The first information may be a street address, communication address (such as phone number or an e-mail/internet address), set of affiliations or preferences (or pointers to such) and/or other information which is personal to the user whereas the second information may be an action instruction, data on a product or service, a unique pointer, for example URL, to information on products or services held remotely.

According to a third aspect of the present invention there is provided a tag for use in the interactive system according to the second aspect of the present invention, comprising means for storing information having a data format which is associated with a predetermined application and means for interacting with a tag reader for enabling the information to be read.

According to a fourth aspect of the present invention there is provided a method comprising generating a service request in response to determining a process to be carried out, forwarding the service request to a client and the client remunerating a supplier of the service requests on the basis of the service request(s) forwarded.

For a particular range of applications a suitable set of types of tag information and corresponding data formats has to be established, and action-setting procedures configured to achieve the desired effect.

BRIEF DESCRIPTION OF THE DRAWINGS

The present invention will now be described, by way of example, with reference to the accompanying drawings, wherein.

DETAILED DESCRIPTION OF THE INVENTION

Figure 1:
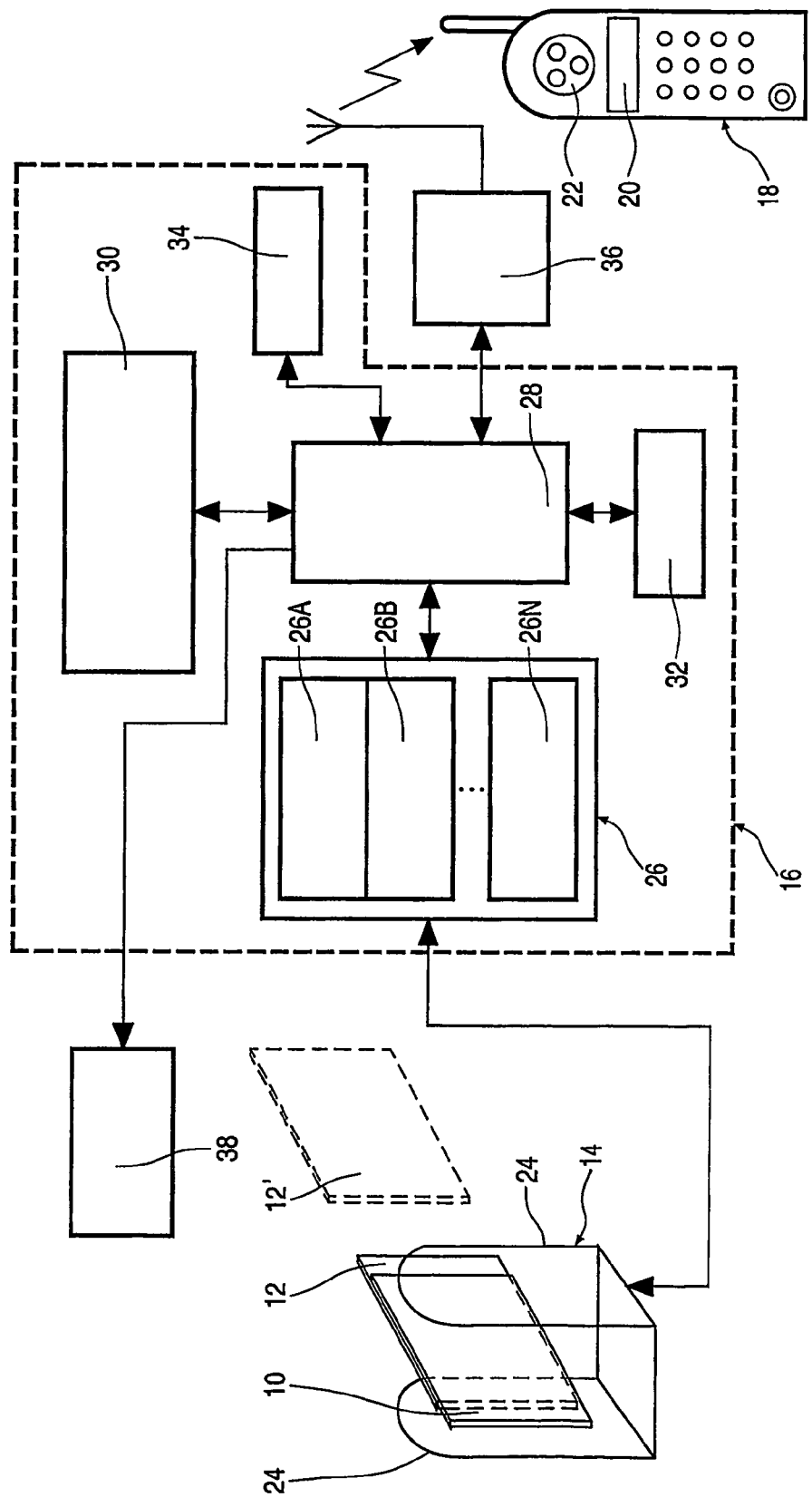
FIG. 1 is a block schematic diagram of an embodiment of an interactive system made in accordance with the present invention.

Referring to FIG. 1, the interactive system operates on the basis of at least two tags 10, 12 or 10, 12' being read within a predetermined time period by a tag reader 14 and the information read-out being supplied to a service request handler 16. The service request handler analyses the data from the tags 10, 12 (or 12') together with the identity of the tag reader, authenticates any confidential part of it and simultaneously jointly determines a process to be carried-out. The process may be the issuing of a command, for example, an instruction to supply certain information or carry out an operation. The command is forwarded to a processor 28 which uses information in a data base 30 to respond to the command. The response is for example relayed over-the-air to a suitable end user means, represented for convenience in FIG. 1 as a cellular telephone 18, but it could be a PDA or other suitable means, or an action is taken such as crediting/debiting the number of units stored on one of the tags or in the data base 30. A user of the cellular telephone 18 may receive the answer as a text message which can be displayed on a LCD panel 20 or as a voice mail message which is heard by way of the telephone's loudspeaker 22, but also could comprise a WML (WAP mark-up language) card displayed over WAP, a segment of audio or video information streamed wirelessly over GPRS or WLAN (for example IEEE 802.11 or Bluetooth, Registered Trade Mark, (RTM)) networks to the user's PDA or cordless/cellular telephone. It is not essential for the response to be relayed over-the-air, it may simply be displayed to the user on a conveniently located audio or video display unit or may be used for updating information in a data base.

The tags may not all operate in accordance with the same protocols, for example either one of the tags could be a unique RF device operating in accordance with a known protocol such as Bluetooth(RTM), Zigbee or IEEE 802.11).

More particularly, the tags 10, 12 (or 12') are radio frequency tags which are interrogated using radio frequency signals transmitted by antennas 24 of the tag reader 14 as the tags are passed substantially simultaneously or in rapid succession between them. These antennas also receive signals transmitted by the tags 10, 12 (or 12'). In a variant of the tag reader 14 suitable for tags of different types, there is a transponder for each type of tag.

In the illustrated example the first tag 10 generally contains relatively secure information such as the cellular telephone number or a SMS (short message service) of the user or WML (WAP) reference to it. The first tag 10, such as SIM card or something similar, may be provided by the network operator as part of the service in expectation of additional phone traffic over the network. The second tag 12 (or 12'), which may be provided by a different organisation, may contain less secure information such as that relating to an action such as "Supply details of special offers, such as half price cakes, available in a store". The combination of the information on tags 10 and 12 (or 12') jointly determine a command to be carried out. An example of a command to be carried-out is "Supply details of special offers, such as half price cakes, available in a store to Mr Z at cellular telephone No.xxxxxxxxx". These details could be supplied as a personalised message to the user via a video display unit (VDU) 38 located in the vicinity of the tag reader or sent by way of the cellular telephone network as a SMS message, voice mail message or an e-mail message. However the second tag 12 (or 12') may contain one or more actions conditional on different tag conjunctions, that is different actions may be related to different classes of users. For example a person presenting to a tag reader 14 an airline executive club membership tag including an indication of their identity and class of membership and an airline executive club tag requesting information about what services are available at that airport to different classes of membership, will be informed of the services being offered to a person having their class of membership.

In a variant of the above example the first tag 10 contains a reference indicating that a customer is a regular/gold customer and the second tag 12 relates to showing the price of a product. When both tags are read the processor 28 notes the status of the customer and provides the product price discounted by say 20%.

In another variant, a tag reader located at the main exit of a site or building may detect a first tag identifying a user and a second tag fitted in a lap top computer carried by the user and effect the process of updating information held in a data base to indicate that the user has taken the lap top computer through the main exit.

In the illustrated embodiment the combination of the information on tags 10 and 12, as well as other tags (not shown), is relayed to and stored in locations 26A, 26B . . . 26n of a store contained within a tag reader of the service request handler 16. An output of the store 26 is coupled to an action server comprising a processor 28 having a data base 30 containing information which can be used in authenticating a tag and in providing a response to a process signal or command received from the tag reader 14. A timer 32 which is usable in determining a time window for the reading of tags 10 and 12 is coupled to the processor 28. A telephone dialler 34 is coupled to the processor 28 to enable an output signal to be supplied to a cellular telephone network 36. In a variant of the described illustrated example the tag may include the user's (WLAN) IP address, so that the connection is made over the IEEE 802.11 or Bluetooth (RTM), network rather than by a cellular phone network. In a further variant the output signal is supplied to the VDU 38.

In operation at least two tags 10, 12 (or 12') are presented substantially simultaneously or in rapid succession to the tag reader 14. The tags represent different types such as the action to be performed, the object on which an action is to be performed and the data which is to be called up. When read by the tag reader 14 they jointly determine the command to be carried out. The data formats used in encoding of the different types of information may be the same or different. If it is the same then the data format of the encoding may include a field comprising bits identifying the type of information. Thus if the tag reader detects a tag having action information before a tag having information identifying a user, it is able to link the two pieces of information to form a command without the respective tag information having to be presented in a predetermined order. It is also possible for a process to be set-up in response to detecting a certain conjunction of tags but only being put into effect when a tag of a certain type is presented to the tag reader. The time period during which the tags have to be presented is determined by the instant at which the final tag of the conjunction of tags is presented.

Figure 2:
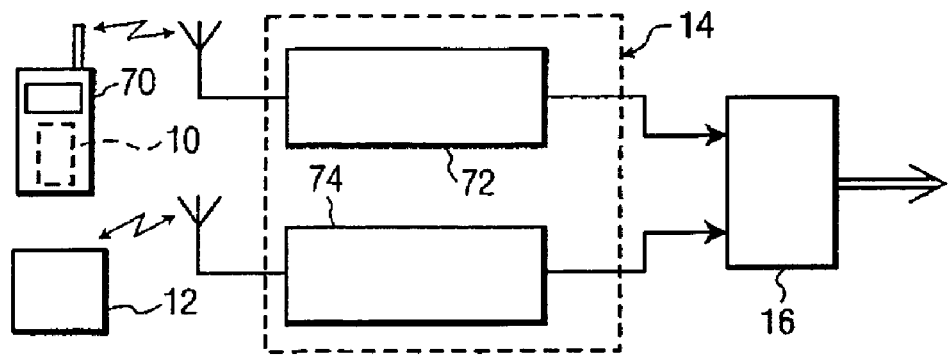
FIG. 2 is a block schematic diagram of another embodiment of the interactive system made in accordance with the present invention

Referring to FIG. 2, the illustrated interactive system comprises a tag reader 14 constructed to read tags 10, 12 from two different organizations. The tag 10 in this example comprises a tag built into or forming a part of a cordless terminal operating according to a suitable protocol, such as Bluetooth(RTM), or Zigbee, and in response to be interrogated by a radio signal causes to be generated a unique wireless identification signal. This identification is detected by a compatible transponder 72, for example a Bluetooth (RTM), transponder or a Zigbee transponder, and relayed to a buffer store in a service request handler 16.

The tag 12 in this example is a RF-ID tag provided by say a retail store and this is interrogated by a RF-ID transponder 74 in the tag reader 14 to provide an action signal. The service request handler 16 combines the identification and action signals and derives from them a process signal which is passed to an action server (not shown) formed by the processor 28 (FIG. 1) and its associated data base 30 (FIG. 1).

The tag reader 14 may be adapted to read other types of coded tags, for example infra-red (IR) bar code tags, other types of RF-ID devices, a meta data identifier of an audio/video digital stream and an IP address device. Additionally the tags may be writable-on so that information stored on the tags may be updated.

Figure 3:
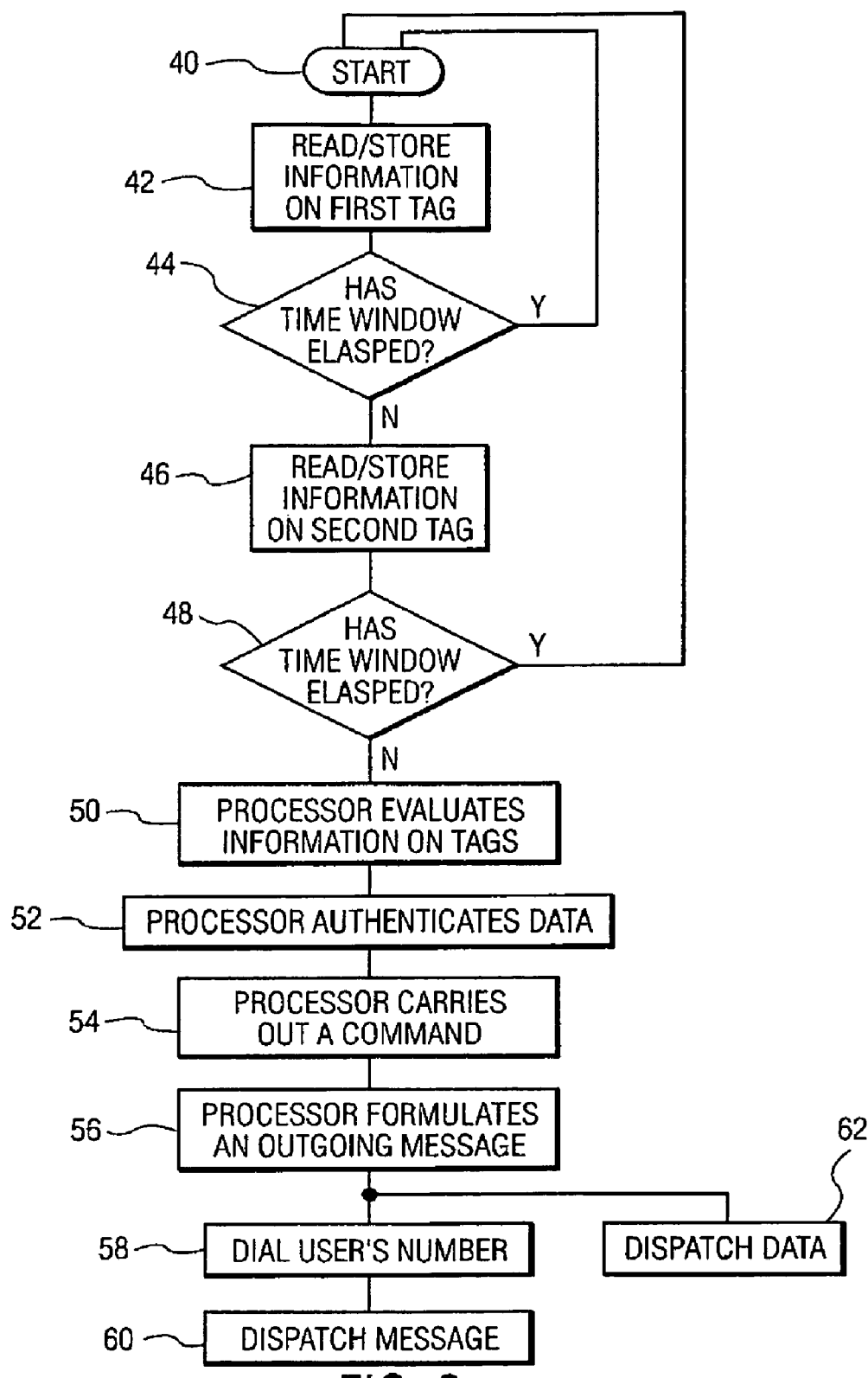
FIG. 3 is a flow chart illustrating an embodiment of the method in accordance with the present invention.

Referring to FIG. 3 the flow chart summarises the information retrieval process in the case of using two tags but this is not limiting because more than two tags may be read within a permitted time window.

The flow chart commences with the start block 40 and proceeds to block 42 denoting reading and storing the information on the first tag 10 to be read. Block 44 denotes checking if the time window has elapsed. If it has (Y) the flow chart reverts to the start block 40. If it has not (N), the flow chart proceeds to block 46 which denotes reading and storing the data on the second tag 12 to be read. Block 48 denotes checking if the time window has elapsed. If it has (Y) the flow chart reverts to the start block 40. If it has not (N), the flow chart proceeds to block 50 which denotes the time window having expired and the processor 28 evaluating the joint information from the tags 10 and 12. Block 52 denotes the processor 28 authenticating the data, especially the user's address on the tag 10. Block 54 denotes the processor 28 carrying-out the command to be performed which may comprise reading out selected data from the data base 30. Block 56 denotes the processor 28 formulating an outgoing message in a format suitable for transmission for example as a text message, voice mail message or e-mail message or for display on a VDU. Block 58 denotes the telephone dialler 34 dialling the user's number and block 60 denotes despatching the text, voice mail or e-mail message. Block 62 indicates the option of displaying the data on a conveniently positioned VDU 38 (FIG. 1).

In a first example a user presents his personal tag and a tag asking for information about wine to the appropriate card reader and the processor using the joint information determines from the data base that the user is a regular customer and normally buys red wine. In response to this the data base calls up data relating to advertising and/or any special offers relating to red wine and relays this information to the user's terminal via a radio link or, optionally, displays the information on the VDU 38.

In a second example a user visits a theme park having several rides which normally require participants to wait in queues. Additionally there is a provision for giving priority (or accelerated) access to people paying extra for their rides. On entering the theme park the user buys an admission ticket (say tag 10), the price of which is related to whether or not the user wants priority (accelerated) access to the ride. It will be assumed that the user has selected priority access. Additionally the user collects tags (say tags 12) relating to enquiring what the current waiting time is for priority access to the respective rides. Whenever the user wants to check-up on the priority waiting time for a particular ride, he presents his admission ticket (tag 10), together with a relevant tag 12, to a tag reader and is informed of the current waiting time by a message displayed on the VDU 38, this information having been held in the data base 30 and being updated regularly. On leaving the ride or the theme park the user can discard/return the tags relating to waiting times for respective rides. In a variant of this example a user buys a read/writable ticket (or tag) containing credit units which can be used purchase rides. When the user presents the ticket together with a RF-ID tag identifying a ride to the tag reader, it admits the user to the ride and simultaneously deducts a credit unit from the number stored in an over-the-air transaction.

In a third example, an access control system in an institution such as prison may be arranged that a security gate will only permit a prisoner or a small predetermined number of prisoners accompanied by a warder to be allowed to pass. In this example the warder and each prisoner wears a transponder type of tag and as they pass a tag reader 14 the tags are read and the service request handler 16 determines whether or not the number of prisoners with the warder is within a permitted limit and if so it sends a command "open gate" to a terminal, which may be cordless, causing the security gate to be opened. If there is no warder present or the number of prisoners exceeds the permitted number then an "alert" signal is transmitted to the terminal which inhibits opening of the security gate and activates an alarm.

In a fourth example applicable to say retail sales, a customer having an identity B is buying a product A or several products A1, A2, . . . An and the sale is made by sales assistant C. In this situation the sales assistant C submits a tag C bearing his/her identity to the tag reader, then the customer's tag, tag B, and a tag A identifying the product. In response to the conjunction of these tags, a sale is made and optionally stock inventories are adjusted and/or a debit is made to the customer's account. In the case of several products A1, A2, . . . An being purchased, a similar process occurs but the product tags A1, A2 . . . An are submitted in turn, whilst the details of tags B and C remain in the tag reader until the purchase has been completed and optionally stock inventories are adjusted and/or the customer's account has been debited.

In the case of a user having several tags (or cards) in his/her possession, the tag reader 14 reads all of the readable tags and selects those tags of apparent interest and derives a command from them. As an example a store X gives to holders of their Gold Card bonus points in respect of their purchases from the store. The store's identity is provided on the Gold Card and is known to the service request handler 16 which is able to ignore information read from tags issued by other stores. What is not ignored is the tag giving the identity of the user and perhaps also then user's cellular telephone number. Thus following a purchase in store X, the service request handler 16 is able to select the user's tag and the Gold Card from other cards which may be present, determine a command to update the total of bonus points, update the bonus points total and inform the user using the VDU 38 and/or by sending a message to the user's cellular telephone.

Figure 4:
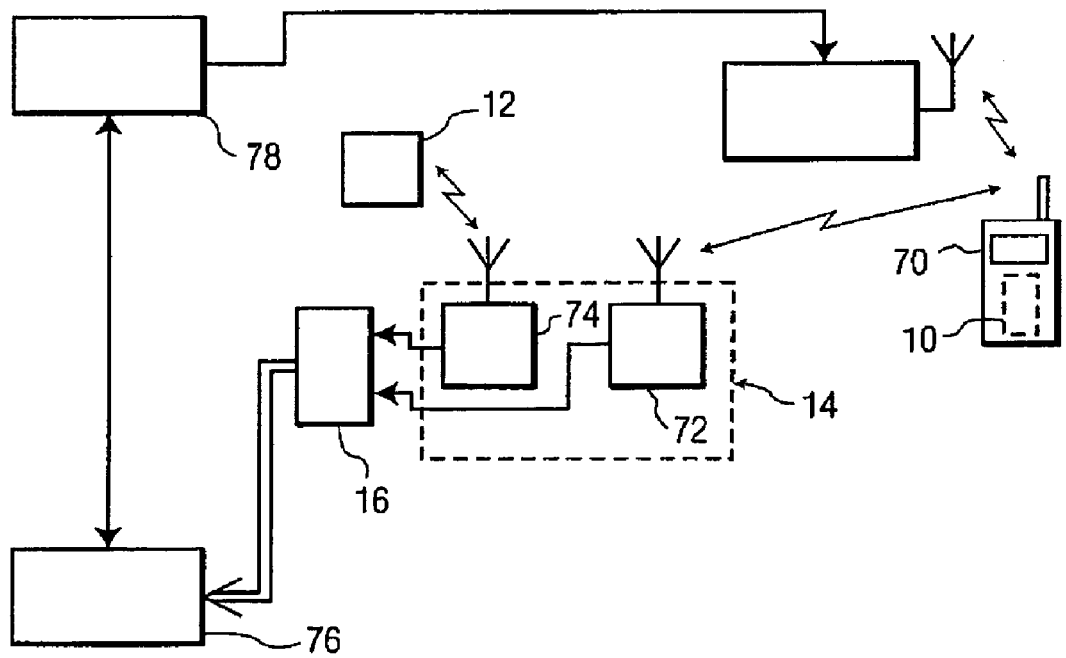
FIG. 4 is a block schematic diagram showing an application of the interactive system made in accordance with the present invention.

FIG. 4 shows an application of the interactive system to a focused product promotion. In the interests of brevity it will be assumed that the tag reader 14 and the tags 10, 12 are of the same type as described with reference to FIG. 2. The information read from the tag 12 relates to providing promotional material associated with a single brand name of sportswear. As a result of interrogating the tags 10 and 12, the service request handler 16 generates a signal requesting that the person identified by the tag 10 be provided with promotional material relating to the relevant sportswear. The generated signal is forwarded to an action server 76. The action server 76 supplies a content supplier, who may be a manufacturer or wholesaler, with a signal including the contact number of the person making the enquiry and the nature of their enquiry. The content supplier 78 in response to the receipt of the signal forwards the requested promotional material to the person's terminal 70 by way of a cellular telephone, Bluetooth(RTM), Zigbee or IEEE 802.11 network.

The operator of the action server 76 is remunerated by the content supplier 78 for forwarding the product enquiry to it. Additionally the action server 76 may compile statistics on those tag readers and their locations through which product enquiries are made and sell this information to the content supplier(s) 78. Such information may be used by the content supplier 78 to promote its products in a way which is more effective than another way. Also it is a relatively cheap way to get such information compared to conducting public opinion surveys.

Although the present invention has been described with reference to radio tags, the tags may be configured as swipe cards which are read using a suitable card reader.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of interactive systems and component parts therefor and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of operating an interactive system, comprising:
   obtaining, within a specified time period, first information from a first tag and second information from a second tag, the system operating independent of a spatial positioning of the first tag and the second tag; and
   using the first and second information to jointly determine a process to be carried out.

2. A method as claimed in claim 1, wherein information about a user is derived by reading a first tag, in that details of an action are derived by reading a second tag, and in that the reading of the first and second tags is carried out within a specified time period.

3. A method as claimed in claim 1 or 2, wherein the specified time period expires with the reading of the latter or last tag.

4. A method as claimed in claim 1, 2 or 3, wherein the first and second tags are provided by different organisations.

5. A method as claimed in any one of claims 1 to 4, wherein information relating to the identity of a tag read is also used in determining the process to be carried out.

6. A method as claimed in any one of claims 1 to 5, further comprising deriving an output signal responsive to the process carried out and relaying the output signal to a user by way of a RF link.

7. A method as claimed in any one of claims 1 to 6, wherein information is obtained from the first and second tags in a time window selected to associate tags belonging to one user and exclude tags from another user.

8. A method as claimed in any one of claims 1 to 7, further comprising:
   authenticating the tag identities.

9. A method as claimed in any one of claims 1 to 8, wherein the process is a service request which is forwarded by an action server to a client and the client remunerates the action server for the service request(s) received.

10. An interactive system comprising:
    a tag reader reading, within a specified time period, two or more tags, the system operating independent of a spatial positioning of the tags; and
    a processor determining a process to be carried out, based on information read from at least two tags.

11. An interactive systems, comprising:
    a tag reader reading at least a first tag and a second tag, within a specified time period, the first tag containing first information and the second tag containing second information, the system operating independent of a spatial positioning of the tags; and
    a processor using the first information and the second information jointly to determine a process to be carried out.

12. A system as claimed in claim 11, further comprising:
    an action server responsive to the determined process to generate an output signal, and a RF link for supplying the output signal to an output device.

13. A system as claimed in claim 12, wherein the output device comprises a cellular telephone terminal.

14. A system as claimed in claim 11, wherein the tag reader has an authentication unit for authenticating the tag identities.

15. A system as claimed in claim 11, wherein at least one of the first and second tags comprises a cellular telephone identification tag provided by a cellular telephone network operator or service provider.

16. A system as claimed in claim 12, wherein the output device comprises a video display unit.

17. A system as claimed in claim 11, wherein the first and second tags are radio frequency tags and the tag reader includes a communicator for communicating by radio with the tags.

18. A method, comprising:
    generating a service request in response to determining a process to be carried out, the process determined by information obtained from tags by an interactive system within a specified time period, the system operating independent of a spatial positioning of the tags;
    forwarding the service request to a client; and
    remunerating a supplier of the service requests on a basis of the service request(s) forwarded.

19. A method as claimed in claim 18, wherein the service request is generated in response to a conjunction of information derived from reading first and second tags within a specified time period.

* * * * *